J. F. ELLMAUERER.
DIRIGIBLE HEADLIGHT.
APPLICATION FILED APR. 4, 1916.
1,194,156.
Patented Aug. 8, 1916.
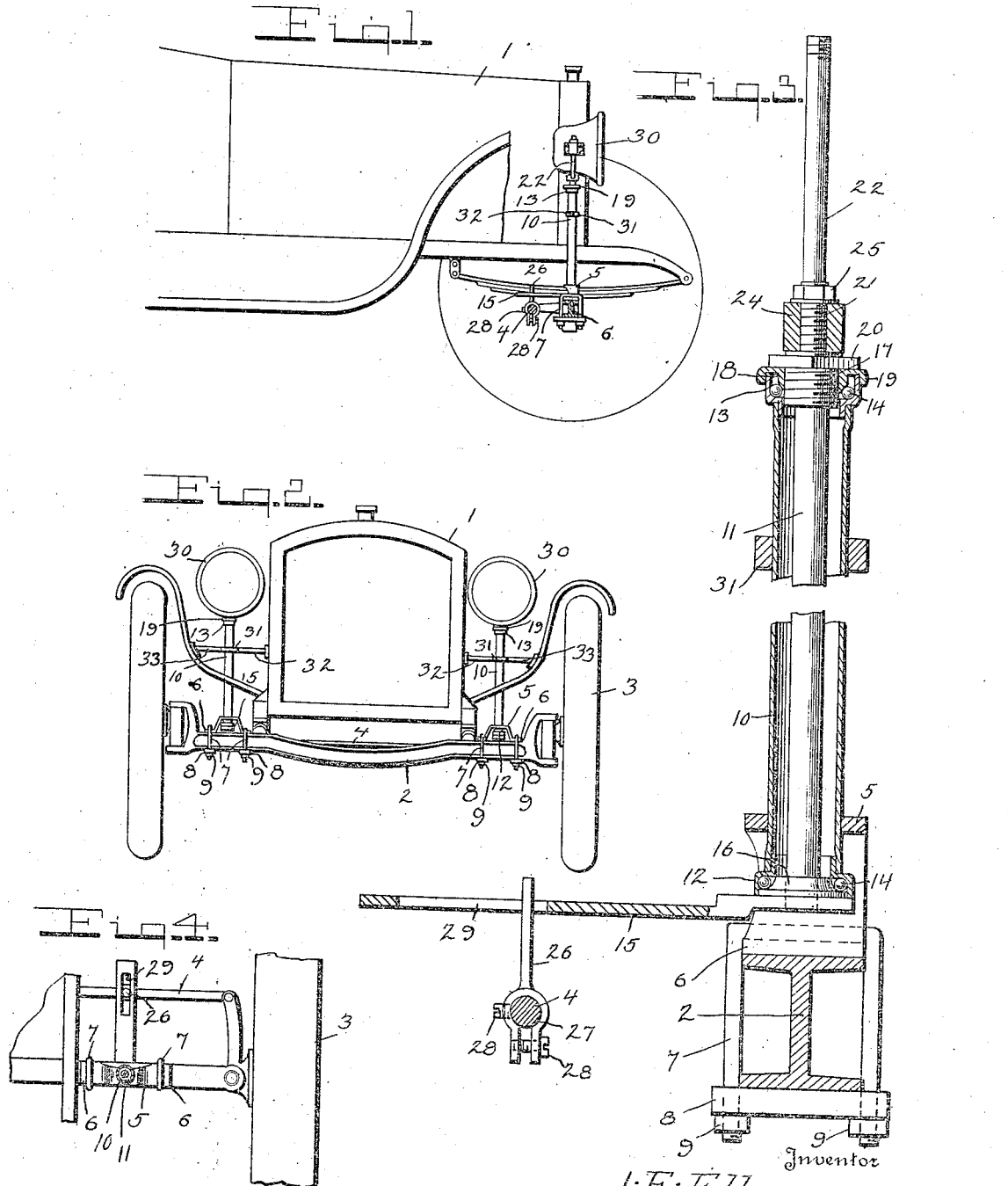

ered thereon by U-shaped clamps 7. A plate 8 is secured

UNITED STATES PATENT OFFICE.

JOHN F. ELLMAUERER, OF FAIRCHILD, WISCONSIN.

DIRIGIBLE HEADLIGHT.

1,194,156.   Specification of Letters Patent.   Patented Aug. 8, 1916.

Application filed April 4, 1916. Serial No. 88,844.

*To all whom it may concern:*

Be it known that I, JOHN F. ELLMAUERER, a citizen of the United States, residing at Fairchild, in the county of Eau Claire and State of Wisconsin, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in a dirigible headlight and one of its objects is the provision of a device of this character, which shall be simple, durable and efficient, and which may be manufactured and sold at a comparatively low cost.

Another object of this invention is to provide a novel means of securing cylindrical casings directly to the front axle of the automobile, to eliminate the danger of the upward and downward movement of the body of the automobile in relation to the front axle and steering gear from interfering with the turning and operation of the lamp standards.

A further object of this invention is to provide a novel means of operatively connecting the lower ends of the standards to the connecting rods of the steering mechanism employed upon automobiles, whereby upon movement of the connecting rods in either direction, the lamp standards will be turned in an opposite direction, throwing the rays of light from the headlights in the path of the front wheels at all times.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a fragmentary side elevation of an automobile, illustrating my invention applied thereto, Fig. 2 is a front elevation, illustrating the means of securing the casings to the front axle of the automobile, Fig. 3 is a vertical sectional view of one of the casings, illustrating the means of journaling the lamp standards therein, and Fig. 4 is a fragmentary top plan view, illustrating the means of operatively connecting the lamp standards to the connecting rod of the steering gear.

Referring in detail to the drawing, the numeral 1 indicates an automobile, having a front axle 2 provided with wheels 3, being connected together by a connecting rod 4, to which my invention is applied. There being usually two headlights employed upon an automobile and as both of the headlights and supports of my invention are identical in construction and in operation, it is not thought necessary to describe both in detail.

A substantially U-shaped bracket 5 is provided with its ends bent at right angles to form feet 6, which are adapted to rest upon the front axle 2 and be secured thereon by U-shaped clamps 7. A plate 8 is secured on the ends of the U-shaped clamps 7 by nuts 9, whereby the plate 8 will be held in tight engagement with the under side of the axle 2 and hold the U-shaped bracket against accidental movement. The U-shaped bracket 5 is provided with an opening to receive a cylindrical casing 10 that rotatably supports a lamp standard 11, which will be hereinafter more fully described.

Secured to each end of the casing 10 are cups 12 and 13, which receive ball bearings 14. The lamp standard 11 extends upwardly through the casing and has secured to its lower end a rearwardly extending arm 15, which is provided with a cone 16 adapted to bear upon the ball bearings 14 in the cup 12. The standard 11 is provided with an enlarged screw-threaded portion 17, having an internally screw-threaded cone 18 thereon, which bears upon the ball bearings within the cup 13. An annular flange 19 is formed on the cone 18 and surrounds the open end of the cup 13, to prevent dirt and other foreign matter from entering. A nut 20 is threaded on the enlarged portion 17 for locking the cone 18 against rotation upon the lamp standard 11.

The upper portion of the lamp standard 11 is reduced and screw-threaded as illustrated at 21 to receive a substantially U-shaped lamp bracket 22 for supporting headlights 30, having a squared portion 24 provided with an internally screw-threaded opening to receive the reduced end 21 of the lamp standard. A nut 25 is threaded to the reduced end 21 to prevent the U-shaped bracket 22 from rotating thereon.

A vertically extending rod 26 is provided with a bifurcated sleeve 27 formed on the lower end thereof, to receive the connecting rod 4 and be secured thereon by set screws 28. The rod 26 is adapted to extend through an elongated slot 29 formed in the arm 15, providing means when the connecting rod is moved in one direction, the lamp standard 11 will be rotated in an opposite direction, throwing the rays of light from the headlights 30 in the path of the wheels 3 at all times.

A collar 31 is detachably secured to the casing 10 intermediate its ends and has pivotally secured thereto brace rods 32 and 33. The brace rod 32 is connected to the radiator of the automobile and the brace rod 33 is connected to the mud guard or fender of the automobile, thus efficiently supporting and bracing the casing 10, which will prevent the device from becoming detached from the automobile in case of the U-shaped clamp becoming detached from the front axle.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A dirigible headlight comprising substantially U-shaped brackets detachably secured to the front axle of an automobile, a casing secured to said U-shaped brackets, cups secured to each end of said casing, ball bearings within said cups, a lamp standard extending through said casing, cones secured to the lamp standard and bearing upon said ball bearings, a lamp bracket secured to the upper end of the standard, a headlight secured to said lamp bracket, and means connected to the lower end of the lamp standard and to the connecting rod of an automobile to turn the headlight according to the turn of the front wheels of the automobile.

2. A dirigible headlight comprising a substantially U-shaped bracket, said U-shaped bracket provided with its ends bent at right angles to form feet adapted to rest upon the upper side of the front axle of an automobile, means for securing said feet to the front axle, a casing secured to said U-shaped bracket, a lamp standard extending through said casing, cups secured to the upper and lower ends of the casing, ball bearings within said cups, cones carried by the lamp standard and bearing upon said ball bearings, a lamp bracket secured to the upper end of the standard, a headlight secured to the lamp bracket, and means for connecting the lower end of the lamp standard to the connecting rod of an automobile.

3. A dirigible headlight comprising a substantially U-shaped bracket provided with its free end bent at right angles to form feet adapted to rest upon the upper side of the front axle of an automobile, U-shaped clamps for clamping the feet of the U-shaped bracket to the front axle, said U-shaped bracket provided with an opening therein, a casing extending through the opening of the U-shaped bracket and frictionally engaging the walls of said opening, a lamp standard extending through said casing, cups secured to each end of the casing, ball bearings in said cups, cones carried by the lamp standard and bearing upon the ball bearings, a lamp bracket secured to the upper end of the lamp standard, a headlight carried by said lamp bracket, and means for connecting the lower end of the lamp standard to the connecting rod of an automobile to turn the headlight.

4. A dirigible headlight comprising a substantially U-shaped bracket provided with its free end bent at right angles to form feet adapted to rest upon the front axle of an automobile, U-shaped clamps securing the feet to the front axle, said U-shaped bracket provided with an opening therein, a casing extending through the opening of the U-shaped bracket and frictionally engaging the walls of the opening, cups secured to each end of the casing, ball bearings in said cups, a lamp standard extending through the casing and cups, said lamp standard provided with an enlarged portion adjacent its upper end and provided with screw-threads thereon, a cone threaded to the enlarged portion and adapted to bear upon the ball bearings, a second cone carried by the lower end of the standard for an engagement with the ball bearings in the lower cup, a lamp bracket detachably secured to the upper end of the lamp standard, a headlight carried by said lamp bracket, and means for operatively connecting the lower end of the lamp standard to the connecting rod of an automobile.

In testimony whereof I affix my signature in presence of two witnesses.

JOHN F. ELLMAUERER.

Witnesses:
C. B. RIEGCHPERGEN,
FRANK EMES.

Copies of this patent may be obtained for five cents each, by addressing the "Commissioner of Patents, Washington, D. C."